United States Patent
Costa et al.

(10) Patent No.: US 7,493,555 B2
(45) Date of Patent: Feb. 17, 2009

(54) DOCUMENT CONVERSION AND INTEGRATION SYSTEM

(75) Inventors: Robert A. Costa, Fairhaven, MA (US); Clayton D. Lewis, Boston, MA (US)

(73) Assignee: IDX Investment Corporation, Burlington, VT (US)

( * ) Notice: Subject to any disclaimer, the term of this patent is extended or adjusted under 35 U.S.C. 154(b) by 587 days.

(21) Appl. No.: 10/786,325

(22) Filed: Feb. 24, 2004

(65) Prior Publication Data

US 2005/0188305 A1 Aug. 25, 2005

(51) Int. Cl.
*G06F 17/00* (2006.01)

(52) U.S. Cl. .................................... 715/249

(58) Field of Classification Search ............... 715/500, 715/523, 200, 249
See application file for complete search history.

(56) References Cited

U.S. PATENT DOCUMENTS

| | | | | |
|---|---|---|---|---|
| 5,832,100 | A * | 11/1998 | Lawton et al. | 382/100 |
| 5,982,955 | A * | 11/1999 | Yaguchi et al. | 382/305 |
| 6,236,767 | B1 * | 5/2001 | Altman | 382/305 |
| 6,633,742 | B1 * | 10/2003 | Turner et al. | 434/350 |
| 6,829,614 | B2 * | 12/2004 | Fujishima et al. | 707/101 |
| 7,100,199 | B2 * | 8/2006 | Ginter et al. | 726/4 |
| 7,155,670 | B2 * | 12/2006 | Takizawa et al. | 715/239 |
| 7,418,632 | B2 * | 8/2008 | Iida | 714/39 |
| 2002/0184269 | A1 * | 12/2002 | Imagou | 707/523 |
| 2003/0046351 | A1 * | 3/2003 | Maruyama et al. | 709/206 |
| 2003/0084105 | A1 | 5/2003 | Wiley et al. | |
| 2003/0088543 | A1 * | 5/2003 | Skeen et al. | 707/1 |
| 2003/0088825 | A1 * | 5/2003 | Chakraborty | 715/500 |
| 2003/0110442 | A1 * | 6/2003 | Battle | 715/500 |
| 2003/0122873 | A1 * | 7/2003 | Dieberger et al. | 345/764 |
| 2004/0002919 | A1 * | 1/2004 | Tosswill | 705/40 |
| 2004/0083430 | A1 * | 4/2004 | Boonen | 715/523 |
| 2004/0111297 | A1 * | 6/2004 | Schoenberg | 705/3 |
| 2004/0143464 | A1 * | 7/2004 | Houle et al. | 705/4 |
| 2004/0172586 | A1 * | 9/2004 | Ragnet et al. | 715/500 |
| 2004/0199876 | A1 * | 10/2004 | Ethier et al. | 715/523 |
| 2004/0205481 | A1 * | 10/2004 | Zuniga et al. | 715/500.1 |
| 2004/0205616 | A1 * | 10/2004 | Rosenberg et al. | 715/523 |
| 2004/0215600 | A1 * | 10/2004 | Aridor et al. | 707/3 |
| 2004/0230898 | A1 * | 11/2004 | Blakely et al. | 715/513 |
| 2005/0055337 | A1 * | 3/2005 | Bebo et al. | 707/3 |
| 2005/0086647 | A1 * | 4/2005 | Ito et al. | 717/132 |

(Continued)

OTHER PUBLICATIONS

Newman et al., A Desk Supporting Computer-based interaction with Paper Documents, ACM 1992, pp. 587-592.*

(Continued)

*Primary Examiner*—Cong-Lac Huynh
(74) *Attorney, Agent, or Firm*—Andrus, Sceales, Starke & Sawall, LLP

(57) ABSTRACT

A document management system is provided for integrating documents generated in an enterprise into an enterprise data store where the documents can be accessed later. Documents in a first format and a specification containing instructions for describing the documents are provided. The documents are received in a second format, along with descriptions of the documents. The documents in the second format are imported into the data store responsive to the descriptions so that they may be located easily. Beneficially, the invention provides simpler and more flexible conversion and indexing processes for users seeking to electronically store and access documents after their creation.

30 Claims, 6 Drawing Sheets

U.S. PATENT DOCUMENTS

| | | | |
|---|---|---|---|
| 2005/0096979 A1* | 5/2005 | Koningstein | 705/14 |
| 2005/0132278 A1* | 6/2005 | Yoshida | 715/513 |
| 2005/0160109 A1* | 7/2005 | Sato et al. | 707/101 |
| 2006/0005139 A1* | 1/2006 | Comaniciu et al. | 715/760 |
| 2006/0026510 A1* | 2/2006 | Boag et al. | 715/522 |
| 2006/0059162 A1* | 3/2006 | Rizk et al. | 707/10 |
| 2006/0085735 A1* | 4/2006 | Shimizu | 715/512 |
| 2006/0139691 A1* | 6/2006 | Gopalasamy | 358/1.15 |
| 2006/0271835 A1* | 11/2006 | Marcy et al. | 715/500 |
| 2007/0008574 A1* | 1/2007 | Henry et al. | 358/1.15 |
| 2007/0198919 A1* | 8/2007 | Clarke et al. | 715/513 |
| 2008/0002218 A1* | 1/2008 | Wang et al. | 358/1.13 |

OTHER PUBLICATIONS

Guimbretiere, Paper Augmented Digital Documents, ACM 2003, pp. 51-60.*

Grasso et al., Augmenting Paper to Enhance Community Information Sharing, ACM 2000, pp. 51-62.*

Kabel et al., Ontologies for Indexing Technical Manuals for Instruction, Google Jun. 1999, pp. 1-10.*

Bons et al., A Formal Specification of Automated Auditing of Trustworthy Trade Procedures for Open Electronic Commerce, IEEE 1999, pp. 1-10.*

Ashman, Electronic Document Addressing: Dealing with Change, ACM Sep. 2000, pp. 201-212.*

Newman, "A Desk Supporting Computer-based Interaction with Paper Documents," ACM, 1992, pp. 587-592.

Guimbretiere, "Paper Augmented Digital Documents," ACM, 2003, pp. 51-60.

Grasso, "Augmenting Paper to Enhance Community Information Sharing," ACM, 2000, pp. 51-62.

* cited by examiner

DOCUMENT CONVERSION AND INTEGRATION SYSTEM

BACKGROUND

CROSS REFERENCE TO RELATED APPLICATIONS

This application is related to U.S. patent application Ser. No. 10/392,573, entitled "Method and System of Context Scanning" and filed Mar. 20, 2003, which is hereby incorporated herein.

FIELD OF INVENTION

This invention relates generally to the management of documents and more particularly to converting paper documents into electronic files and indexing the files for subsequent access.

BACKGROUND OF THE INVENTION

Although heralded for some time now, the concept of a paperless workplace has not become a reality for most enterprises. Paper documents continue to persist, often containing important information that must be preserved and archived for later access. Take for example a health care provider. The first time a patient visits a hospital, health maintenance organization office, or doctor's office, for instance, it is commonplace for paper documents reflecting a patient's identity, insurance coverage, contact and emergency information, medical history, and waivers, to be generated. The enterprise customarily collects and stores the documents so that they may be accessed at subsequent points in the patient-provider relationship, for instance when a doctor needs to refer to the patient's medical history or the patient must be billed for services provided.

Frequently, especially in large enterprises, there is a desire to convert and store paper documents in electronic form. The alternative, retention of the paper documents themselves, for instance in a warehouse, can be costly and make it difficult to locate and access needed information. Converting the documents to an electronic format provides several benefits. It allows the documents to be stored inexpensively and placed on a network where multiple users can easily access them. Electronic documents may also be integrated more directly into the operations of an enterprise. For instance, taking again an example of a health care provider enterprise, an electronic file containing insurance information could be directly linked into an accounts receivable application for use in generating a patient bill. Such integration can reduce the burden on administrators and reduce the risk that patient documents will be misplaced or lost.

Before they are stored, electronic files must be created from the paper documents and indexed. The conversion and indexing processes are typically very labor intensive, making them ideal for outsourcing. The task of performing the conversion and indexing tasks may be complicated, however, by the formatting requirements of the downstream applications that will use the files. This complication can limit the range of outsourcing options, as infrastructure in the form of software or hardware specific to the downstream applications, as well as familiarity with the downstream application, can be required to complete the conversion. Furthermore, companies may choose, for various reasons, to outsource only part of the conversion and indexing process, or may desire to change file descriptions to meet emerging business needs after the initial conversion has been done.

Thus there is a need for a system that enables paper documents to be easily converted into electronic documents and stored in an intuitive way for later access. In addition, the solution should allow for seamless integration between external vendors performing part or all of the conversion process and the enterprise customers who generate and provide the documents and will later use the electronic files in their business. In addition, the format of the electronic files should allow them to be adapted later to changing business needs. Simpler and more flexible conversion and indexing processes, in turn, will create more options for an enterprise to manage its documents, with or without the help of outsourcers.

SUMMARY OF THE INVENTION

In accordance with the present invention, systems and methods for converting and integrating documents into the operations of an enterprise are disclosed. In an embodiment, the present invention is capable of supplying a document in a first format and a specification comprising instructions for creating a description of the document, receiving the document in a second format, receiving a description of the document generated responsive to the specification and descriptive of an attribute of the document, and importing the document in the second format into the data store responsive to the description. By performing these steps, the present invention beneficially allows paper documents to be converted and integrated into an enterprise, and the conversion and integration tasks to be performed by different entities.

In another embodiment, the invention comprises, for example, the elements of a repository, a batch import module, and a data store. The repository is configured to store documents in a first format and a specification. The specification comprises instructions for creating descriptions of the plurality of documents based on attributes of the documents and defining the syntax of the descriptions. The repository also is configured to supply the documents and specification to a conversion facility. The batch import module is adapted to receive the documents in a second format and descriptions of the plurality of documents in the second format generated responsive to the specification, and is further adapted to import the plurality of documents in the second format responsive to the descriptions into the data store. The data store holds documents in the second format and is configured to provide access to a user to the plurality of documents in the second format. The system disclosed thus is designed to take a specification and documents in one format, and to import the documents in another format to a data store where a user can later access them.

In another embodiment of the present invention, a computer-implemented method for integrating electronic files into a data store responsive to descriptions of the files is provided. The invention performs the steps of receiving the electronic files and the descriptions of the files, locating the electronic files on a storage medium based on location information contained within the descriptions, copying the electronic files into the data store, extracting indexing data associated with the electronic files from the descriptions of the electronic files, and indexing the electronic files in the data store responsive to the indexing data extracted from the descriptions of the electronic files. In another embodiment, the invention comprises various computer program products for carrying out these and other steps provided.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

While the present invention will be described in connection with preferred embodiments thereof, it will be understood that it is not intended to limit the invention to those embodiments. On the contrary, it is intended to cover all alternatives, modifications, and equivalents as may be included within the spirit and scope of the invention as defined by the appended claims.

Figure 1:
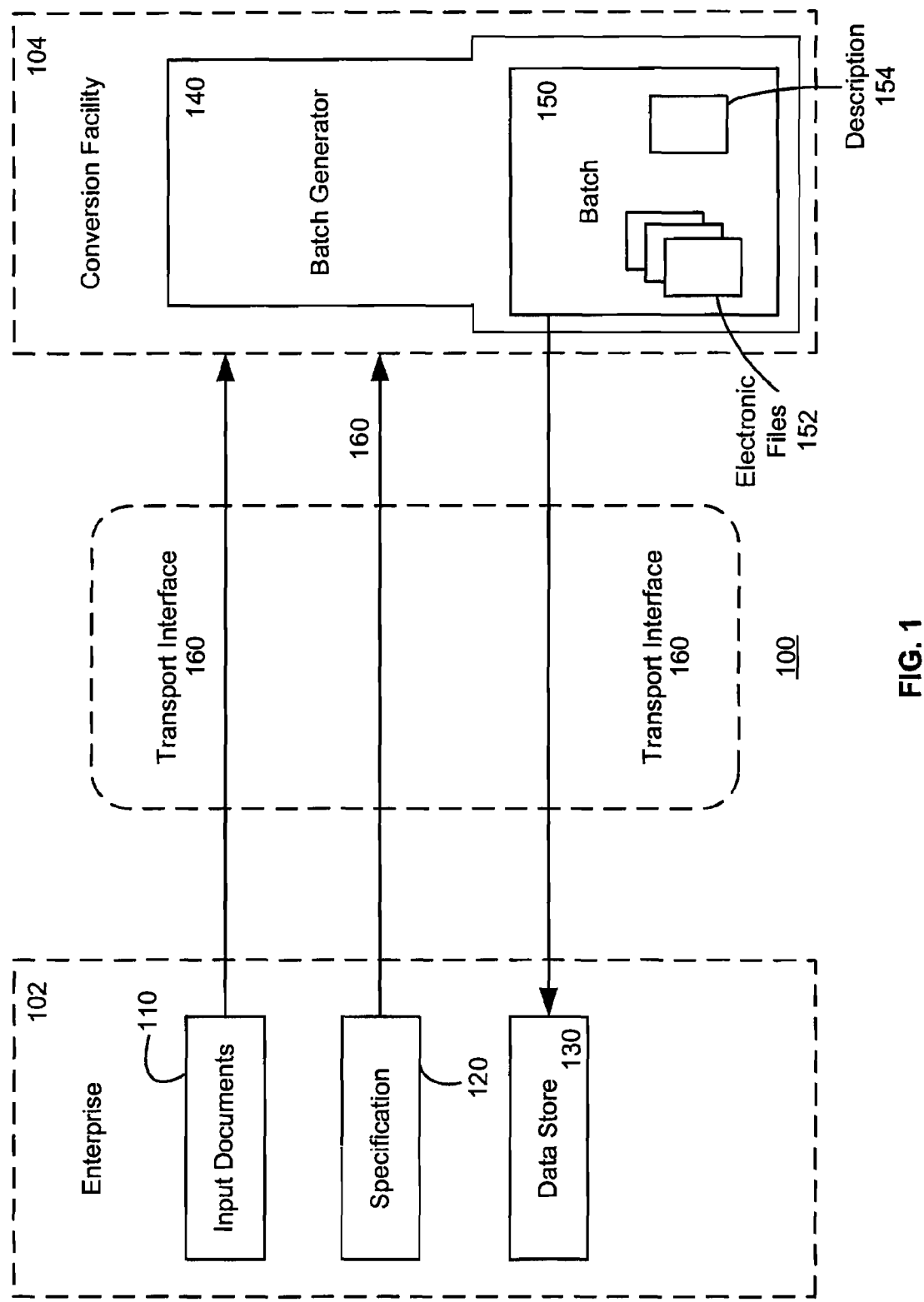
FIG. 1 is a high-level block diagram illustrating an exemplary environment 100 of a batch creation and import system in accordance with an embodiment of the invention.

FIG. 1 is a high-level block diagram illustrating an exemplary environment 100 of a batch creation and import system in accordance with an embodiment of the invention. In the environment 100 of FIG. 1, an enterprise 102 generates input documents 110, such as paper documents, and a specification 120, which contains instructions on how to create batches 150 from the input documents 110. The input documents 110 and specification 120 are passed to a conversion facility 104. The conversion facility 104 supplies the input documents 110 and specification 120 to a batch generator 140, which uses them to create a batch 150. The batch 150 includes a group of electronic images of the input documents 110 and descriptions 154 of the files formatted according to the specification 120. After being created at the conversion facility 104, the batch 150 is then passed back to the enterprise 102. The enterprise 102 integrates the batch 150 into a data store 130, where the batch 150 can be accessed by a user application 410.

The input documents 110 and specification 120 may be supplied by various sources. The input documents 110 can be paper documents, electronic files 152, or may be in another machine or human readable format. In the case of a health care provider or other customer-facing enterprise 102, the source of the input documents 110 may be interactions with customers or third parties such as insurance or billing companies; alternatively an input document 110 may also come from a legacy computer system, a vendor, another application or other source.

The specification 120 may also take various forms and be generated within or outside of an enterprise 102. The specification contains instructions on how to describe various attributes of the input documents 110. Some of these attributes may include creation date, source, or conversion date of a document; alternatively they may also reflect the contents of the documents 110. When the documents comprise health records, for instance, the specification 120 may include attributes such as patient name, internal patient ID, patient medical record number, and document type by which an input document 110 could be described. These attributes may be represented as index structures. The index structures within a specification can be changed according to the preferences of the enterprise that will eventually use the files described. The specification may designate any index structure, or none at all. In an embodiment, the specification itself may comprise for example, an XML Document Type Definition (DTD). An exemplary specification 120 is described in more detail below in the discussion of FIG. 3.

The enterprise 102 is an organization that provides input documents 110 and a specification 120 to a conversion facility 104, and in return receives a batch 150. The enterprise 102 may be an entity that generates a large number of paper documents and desires easy access to those documents electronically. The enterprise 102, for example, could be a health care provider that collects paper documents such as invoices, copies of patient IDs and insurance records, and mail correspondence. Such an enterprise 102 may wish to store information contained in these paper records in an organized fashion for later access, for instance for billing or customer profiling purposes. The enterprise 102 has a data store 130, described in more detail below, which may store enterprise files so as to facilitate such access.

The data store 130 contains electronic files 152 and an index to the files. The data store 130 may take the form of an electronic database; alternatively it may be implemented through another kind of repository. It can be hosted on a server, personal computer, or storage media.

The conversion facility 104 receives input documents 110 and a specification 120 and converts them into a batch 150. The conversion facility 104 could be or belong to the same entity as the enterprise 102, or could comprise an outsourcing company or service hired to process documents, or could represent another third party. The conversion facility 104 hosts a batch generator 140, described more in detail below, which converts the input documents 110 and specification 120 into a batch 150.

In the environment shown in FIG. 1, a specification 120, input documents 110, and data store 130 are all housed in a single enterprise 102, whereas a batch generator 140 is located in a conversion facility 104. However, it is not necessary for every embodiment of the invention to include all of the elements depicted. Furthermore, it is not necessary for the elements to be housed as shown; the elements can be hosted by other entities or in some cases may even stand alone. In some implementations of the system, the various elements may also appear in different configurations. Likewise, as other elements and sub-elements are described throughout the invention, it should be understood that various embodiments of the invention may exclude elements and sub-elements described, that the elements and sub-elements may be hosted in configurations other than those shown, and that elements and sub-elements, even within an element, may be hosted in different locations or by different entities than those shown.

As depicted in FIG. 1, transport interfaces 160 couple the enterprise 102 to the conversion facility 104. Each of these interfaces 160 may comprise a local and/or wide area network or may use any conventional networking technology, such as Ethernet, TCP/IP, or HTTP. In an embodiment, one or both of the interfaces 160 are connected through different communication technologies, such as IEEE 1394 FireWire, universal serial bus (USB), serial, and/or parallel connections. In yet another embodiment, there is no direct connection between the various items. Instead, paper documents or other data are physically transported, or may be encoded on a storage medium, such as a floppy disk, CD-ROM, DVD, or other magnetic, optical, or semiconductor memory, and then physically transported to their destination.

Figure 2:
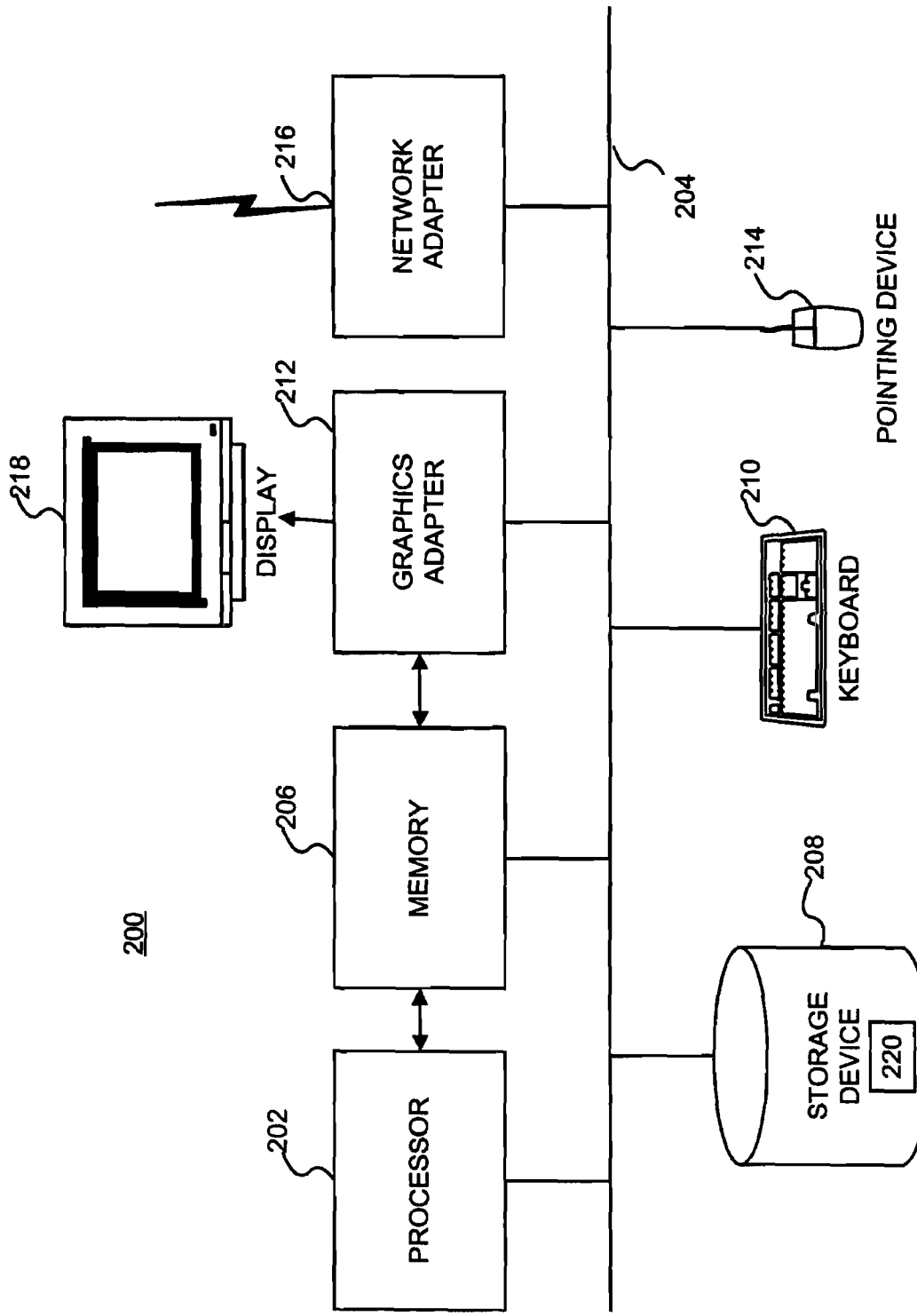
FIG. 2 is a high-level block diagram illustrating a functional view of a typical computer system 200 for hosting one or more of the elements of the environment 100 of FIG. 1 according to an embodiment of the present invention.

FIG. 2 is a high-level block diagram illustrating a functional view of a typical computer system 200 for hosting one or more of the elements of the environment 100 of FIG. 1 according to an embodiment of the present invention. Other elements and sub-elements described below may also be hosted on such a computer system 200. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network.

As is known in the art, the computer system 200 is adapted to execute computer program modules for providing functionality described herein. As used herein, the term "module" can refer to computer program logic for providing the specified functionality. A module can be implemented in hardware, firmware, and/or software. Preferably, a module is stored on the storage device 208, loaded into the memory 206, and executed by the processor 202.

The types of hardware and software within the computer system 200 may vary depending upon the implementation of the batch creation and import system. For example, a batch creation and import system operating in a high-volume environment may have multiple processors and hard drive subsystems in order to provide a high processing throughput, as well as multiple displays and keyboards in order to support multiple simultaneous users. Likewise, certain embodiments may omit certain components, such as the display 218, keyboard 210, and/or network adapter 216 depending upon the specific capabilities of the system. In addition, the computer system 200 may support additional conventional functionality not described in detail herein, such as displaying images in a variety of formats, allowing users to securely log into the system, and supporting administrative capabilities.

Figure 3:
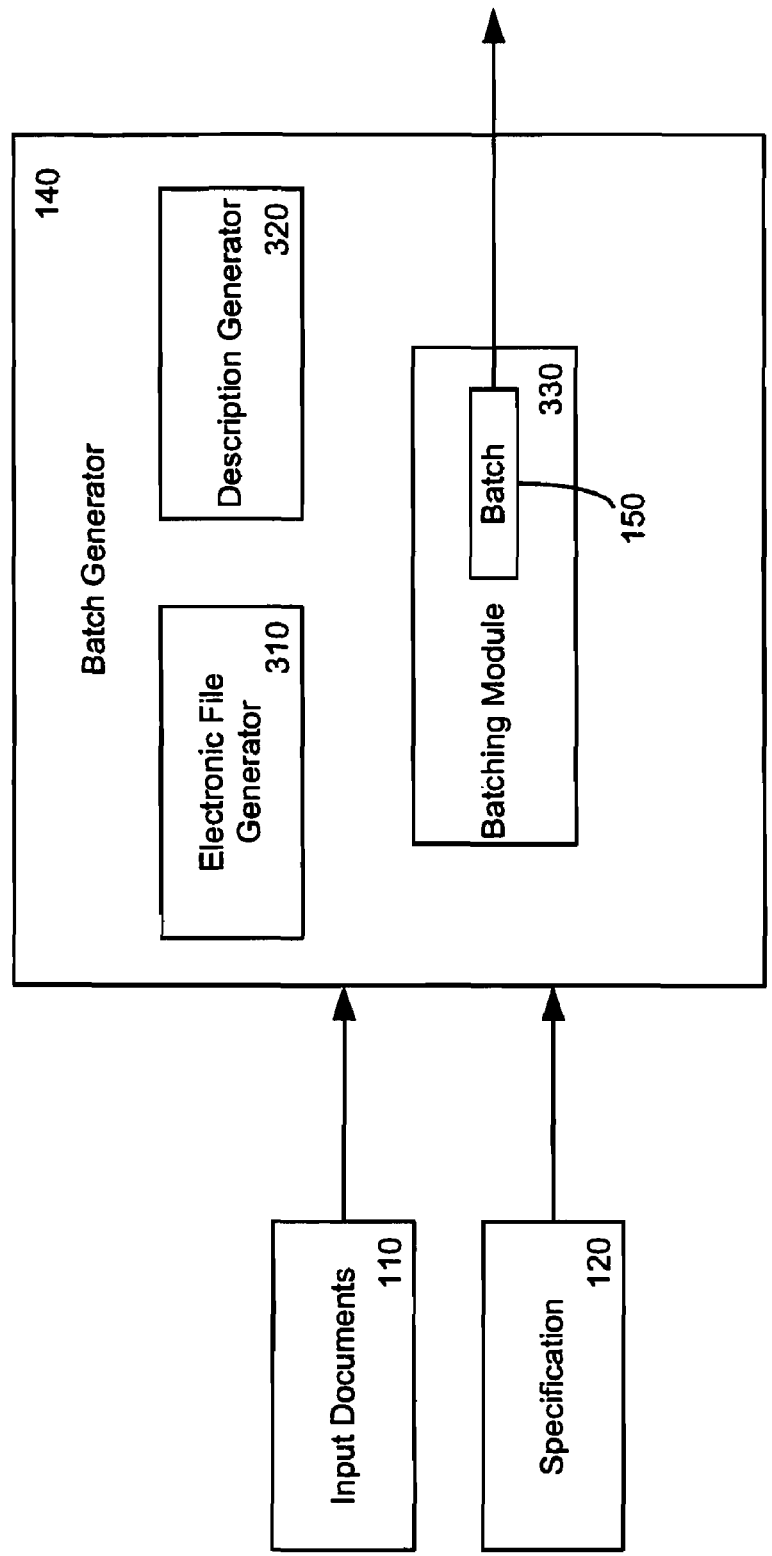
FIG. 3 illustrates the batch generator 140 of FIG. 1 in greater detail.

FIG. 3 illustrates the batch generator 140 of FIG. 1 in greater detail. In one embodiment, the batch generator 140 includes various subsystems to receive input documents 110 and a specification 120 and generate a batch (or batch file) 150 or batches 150 based on them. These subsystems include an electronic file generator 310, a description generator 320, and a batching module 330. The batch generator 140 may comprise a unit or service within a company that converts paper documents to electronic files 152 and creates descriptions 154 of the electronic files 152. Alternatively, it may include a device that relies on automated image conversion, description generation, and grouping capabilities to create a batch 150. The functions of the batch generator or its subsystems may be implemented in part through various modules.

An electronic file generator 310 accepts input documents 110 and converts them into electronic files 152, preferably electronic image files. If the input documents 110 are in the form of paper documents, for instance, the electronic file generator 310 may use a scanner to convert the documents into files in .pdf, .tiff, .jpeg or other format. If an input document 110 comprises one several-page paper document, or a single document has two sides, the electronic file generator 310 may create one electronic file per relevant side of the paper document. However, if the input documents 110 are already in an electronic form accessible by the user application 410, an embodiment of the invention may exclude an electronic file generator 310. For instance, information captured on a customer call screen, for instance, may only exist in electronic form. An embodiment of the invention designed to work with this kind of input could omit an electronic file generator 310 and still implement the invention.

Turning now to the description generator 320, the description generator 320 receives the input documents 110 and the specification 120 and creates one or more descriptions 154 of the input documents 110 based on them. Alternatively, the description generator may use the electronic files 152 created by the electronic file generator 310, rather than the input documents 110, to create a description 154. The description generator 320 uses the specification 120 to determine what information about or attributes of the files to record in the description 154 and what form the description 154 should take. For instance, if the specification 120 is in the form of an XML Document Type Definition (DTD), the description generator can use it to create a description 154 in XML for instance, in the form of an XML message or document. From the DTD, a human or machine can determine what fields and values can be recorded in the XML document or message, which values are mandatory and which optional, and what syntax should be used. The description generator may be housed in the same or a different enterprise as the image generator. In an embodiment, an outsourcer only performs the scanning step, and returns the scanned documents to an enterprise that indexes the documents.

In an embodiment, the description 154 specifies attributes of an electronic file including, for instance, its file location, its creation date, its interrelationships with other electronic files 152 (for instance, if two electronic files 152 are two sides of the same original input document), the content contained in the file, and various attributes by which the file can be indexed. A description 154 need not contain information about all of these attributes of an electronic file, but other details may also be included in some embodiments. In the case of an electronic file based on a patient record generated by a health care provider and scanned in by a vendor, a description 154 could include values to correspond to fields such as Date Scanned, Patient Name, Filename, Document Type and Status, or an index structure such as Patient Index structure and values. For an index structure such as Patient Index structure, several sub-elements may be defined. In an embodiment, the Patient Index structure includes a lookup functionality by which a patient file can be located by any of several different identifiers. This makes it easy for external systems that may have only limited information about a patient file to access the source files.

A single description 154 can describe more than one image or input document 110, and more than one description 154 may describe the same image or input document 110. In one example, two electronic files 152 comprise two sides of a patient address record that contain information only about the patient's billing address. A single description 154 may be used to describe both of these electronic files 152. In another example, a single electronic file contains records of payments made on behalf of many patients by a single insurance company. In such a case, several descriptions 154 154, one for each individual payment made, may be generated based on information contained in the single electronic file.

Turning to the batching module 330, the batching module 330 receives a description 154 created by the description generator 320 and electronic files 152 created by the electronic file generator 310. The batching module 330 uses these to create one or more batches (batch files)150. A batch is comprised of a group of electronic files 152 and the description or descriptions 154 associated with the electronic files 152 in the group 150. By putting the files in batches, the invention increases the ease of handling the files and allows them to be processed more efficiently. In one embodiment, creating a batch can be thought of as putting a virtual "rubberband" around a group of individual electronic files 152 and the descriptions 154 that are associated with them.

The batching module 330 puts the electronic files 152 into various groups. Electronic files 152 may be grouped together according to any number of considerations and objectives, including manageability, logical relationships between the files, or common file characteristics. A module, person, sorting system, or other grouping mechanism may carry out the grouping function.

After the electronic files 152 have been grouped together, in one embodiment, a batch ID may be assigned to each group of files. The batch ID can be in the form of a number, word, alphanumeric combination, or other identifier. The batch ID may correlate to the date of creation of the batch or other value. After a batch ID has been assigned to a group of electronic files 152, the descriptions 154 associated with the electronic files 152 may be updated to include batch information including the batch ID. Where the description 154 comprises an XML file, a batch ID element may be defined, and each individual batch ID saved as a value. In addition, a batch status element, as well as other elements, may be defined and saved.

In an embodiment, a batch ID may also be assigned to a group of electronic files 152 that share certain characteristics. For instance, in the context of health records, all electronic files 152 in a group may relate to a certain patient and reflect documents originated from the same health facility. In such a case, in an embodiment of the invention, the batch ID can be associated with a batch file default description 154 that can be saved to the description or descriptions 154 associated with each electronic file in the group. This allows descriptions 154 to be created more efficiently by essentially allowing the batch ID to serve as shorthand for a number of shared attributes that might otherwise have to be coded on an individual description basis.

The batch 150 created by the batching module 330 includes a group of electronic files 152 created by the electronic file generator 310 and a description or descriptions 154 of those files created in accordance with the specification 120. As one example, a batch 150 may include descriptions 154 in the form of XML documents and electronic files 152 that have been created by processing paper documents with a scanner. However, different constructs and forms may also be used.

Figure 4:
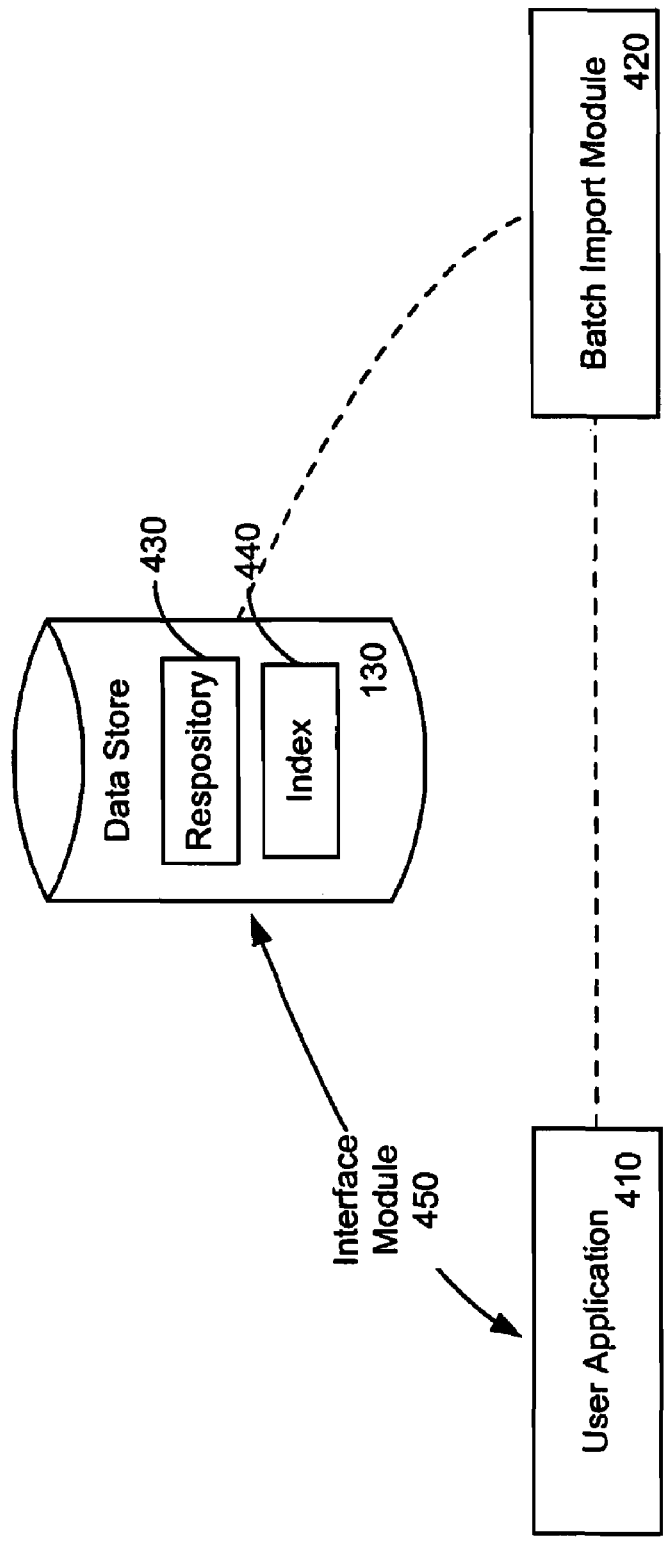
FIG. 4 illustrates an environment including the data store 130 of FIG. 1 in accordance with an embodiment of the invention.

FIG. 4 illustrates the environment within the enterprise that utilizes the data store 130 of FIG. 1 in accordance with an embodiment of the invention. In addition to the data store 130, the environment includes a user application 410, an interface module 450 and a batch import module 420. The user application 410 is a module that carries out various functions and accesses information in the data store 130 through the interface module 450. It may be hosted on a computer system 200 such as the one represented in FIG. 2, a server, or any other platform including a dedicated device. The data store 130 is comprised of a repository 430 and an index 440. The repository 430 contains data records that can be accessed by the user application 410. The index contains references to the data records that allow a user to easily locate and access relevant data records. The user application 410 may be installed on a computer or computers or other medium in the same or different location as the data store 130. The batch import module 420 can be hosted on the same machine as the user application 410 or data store 130; alternatively it may be located elsewhere.

The user application 410 may access the data store 130 through an interface module 450. In an embodiment, the interface module 450 enables the user application to access records in the data store in connection with a database object; in another, the application may search for records in an index and locate them accordingly. The interface module may also support the synchronization of data and the retrieval and updating of records by the user application. The interface module 450 can comprise calls within an operating environment, an intranet or other network. Alternatively, it may be based on a variety of alternative mechanisms, including email, http, ftp, or accessing an attached network device.

The batch import module 420 accesses the batch 150 and adds data records to the data store 130 based on the electronic files 152 and description or descriptions 154 contained in the batch 150. It also uses information contained within the description 154 to create references to the data records it adds to the data store 130 so that they can be accessed easily by the user application 410.

Figure 5:
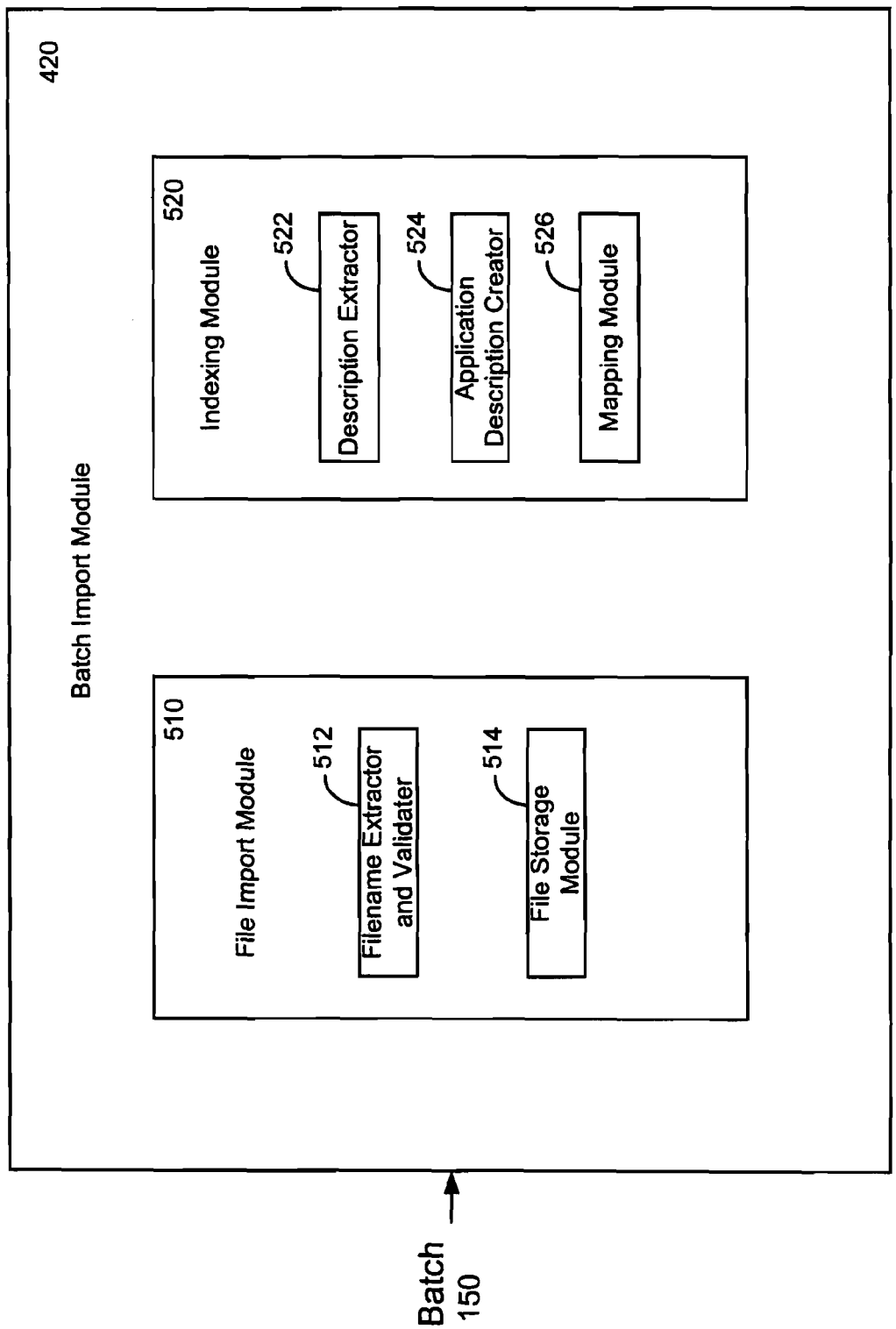
FIG. 5 illustrates the batch import module 420 of FIG. 4 in greater detail.

FIG. 5 illustrates the batch import module 420 of FIG. 4 in greater detail. The batch import module 420 receives a batch 150 and saves the files and information contained within the batch 150 to the data store 130. A file import module 510 and an indexing module 520 within the batch import module 420 to perform these tasks. The file import module 510 saves files contained in the batch 150 to the data store 130, and includes subsystems to achieve this functionality. These subsystems include a filename extractor and validater 512 and a file storage module 514. The indexing module 520 creates references in an index 440 by which various records added to data store 130 may later be accessed. The indexing module may include, in part, a description extractor 522, an application description creator 524, and a mapping module 526. The file import 510 and indexing modules 520 described above may be implemented in various ways. The batch import module 420 can stand alone or be attached to the data store 130, user application 410, or other module. In an embodiment, the batch import module 420 is part of a user application server. This allows the batch import module to take full advantage of the application's code base for handling images, data, and communications; and to run constantly, rather than having to be turned on or off.

The file import module 510 receives a batch 150 and stores the images contained within it (or copies of them) to the data store 130. As described above, this may be accomplished in part through a filename extractor and validater 512. First, the filename extractor and validater 512 obtains file location information from the description or descriptions 154 within the batch 150. In the case of an XML file, a parser may perform this step by extracting filenames from an XML document. The filename extractor and validater 512 checks to ensure that the location information is well-formed or otherwise can be recognized and read. Valid location data is then used to access the files. In an embodiment, multiple batch files, stored in directories, sub-directories, and multiple levels of sub-directories of a computer or computers can be accessed simultaneously. The directories may also be configurable in the properties file of the user application. Commonly the location information will be in the form of filenames; however, other information, stored in XML documents or files with other formats, may also be used to access the electronic files 152.

The filename extractor and validater 512 attempts to locate a file using the location information provided. If the filename extractor and validater 512 cannot locate a file for any variety of reasons including invalid format, file hot found, or file not readable, in an embodiment, an error message is generated. An error log may be displayed immediately, for example in the display 218 of the computer system 200 of FIG. 2. Alternatively or in addition, errors may be logged in the memory 206 of a computer system 200, as shown in FIG. 2, and then displayed when the filename extractor and validater 512 has processed all of the files in a batch 150 or set of batches 150. In an embodiment, the filename extractor and validater 512 returns the names of valid and invalid filenames that have been extracted from the batch 150. In an embodiment, an individual location name will only be considered valid if all of the electronic files 152 contained within a batch 150 are successfully located. This can prevent the partial or incomplete filing of a batch, and the duplicate filing of files that could occur were a batch to be processed first only partially successfully, and then processed again successfully.

The file storage module 514 receives the validated location information. In an embodiment, the file storage module 514 uses the validated location information to access and copy the electronic files 152. It then stores the copied electronic files 152 as new data records to the data store 130. Alternatively, the electronic files 152 are not copied but are moved directly into the data store 130. If necessary, the file storage module can convert the files or copies of the files into a format that can be read by the downstream user application 410. In an embodiment where the files are copied rather than moved directly, the files may be deleted following any number of standard operating system file deletion methods. At this or other points in the process, the descriptions 154, documents, electronic files 152, or other records no longer in use may be periodically purged using similar or other methods.

The indexing module 520 can contain a description extractor 522, an application description creator 524, and a mapping module 526. In some embodiments of the invention, the indexing module will only contain one or two of these elements. The elements, in turn, may be composed of various individual sub-modules. The description extractor 522 receives a batch 150 and extracts description information contained within the batch 150. In an embodiment, the description information is contained within an XML document, and includes various XML indices and index 440 values. The description extractor may comprise a parser that obtains description information from the XML document. Alternatively, the description information may be stored in other forms, and means other than a parser may be used to obtain the description information. The description information can then be passed to an application description creator 524.

In an embodiment, the application description creator 524 receives description information from the description extractor 522 and uses it to create a description that can be accessed by the user application 410. This description is called an application description. In one embodiment, the user application 410 is IMX, a billing application for used in a health care provider enterprise 102 provided by IDX systems of Burlington, VT. The application description may be assigned a unique ID. Other embodiments may involve other formats for the application description and user applications. Once created, an application description may be stored to the data store 130 or to another location where it can be accessed by a user application 410.

The mapping module 526 collects index information about the data records added by the batch import module 420 from various sources. This information may be based on data and index 440 values contained in the application descriptions 154, input documents 110, or descriptions 154 generated by the batch generator 140. The information also may include any IDs assigned to the files, groupings, records, or application descriptions 154, as stored in the data store 130 or in other locations. The mapping module 526 takes this index information and creates references based on it, and stores these in the index 440 or indices of the data store 130.

For example, if an application description describes an electronic file and includes doctype, index01, index02, and image location indices and corresponding values for each of these indices, the mapping module 526 will save each of the index values to various related indices. These indices may be contained in the data store 130, as shown, or may be in another location where they can be accessed by the user application 410. When a file is referenced in numerous indices, it becomes easier to subsequently locate the file.

Figure 6:
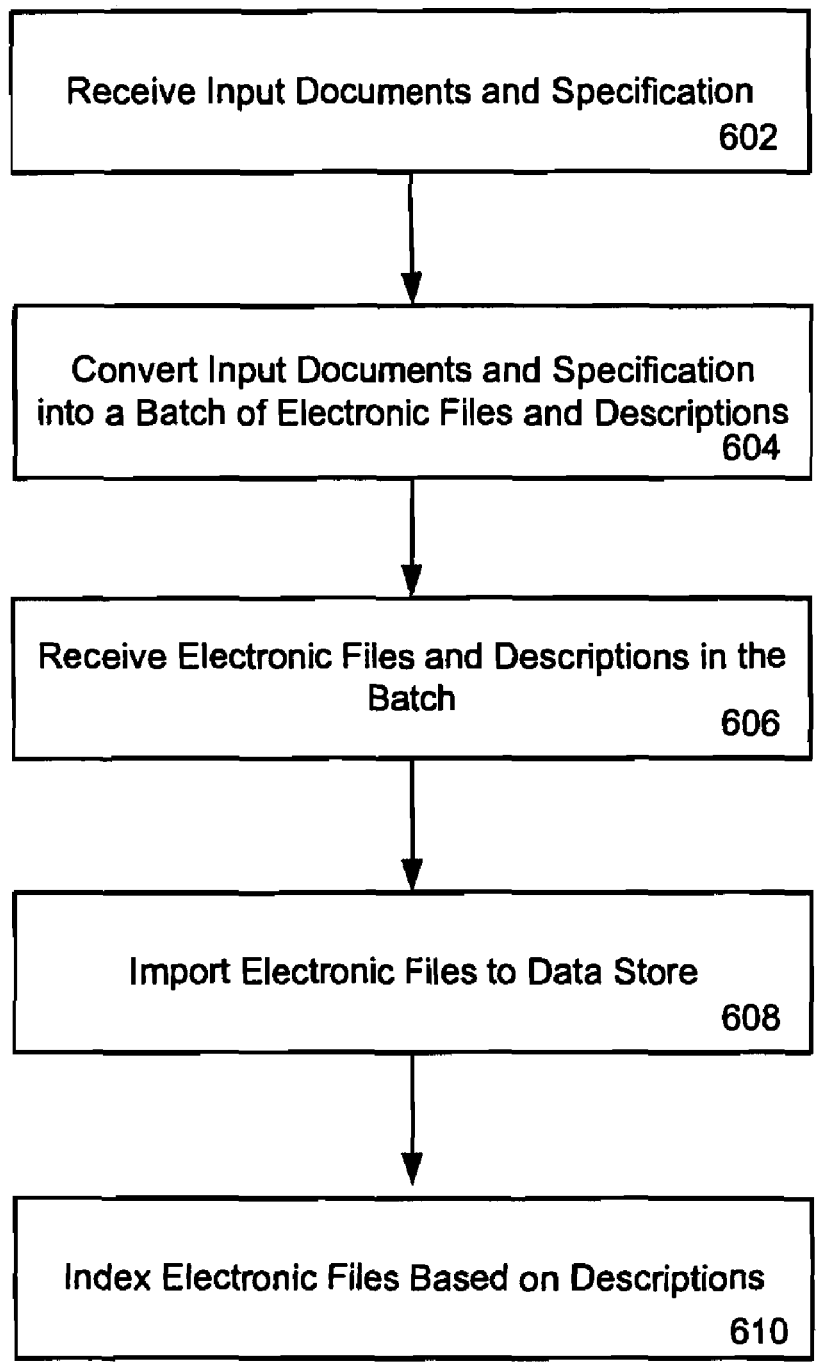
FIG. 6 is a flowchart illustrating the operation of a batch creation and import system according to one embodiment.

FIG. 6 is a flowchart illustrating the operation of a batch creation and import system according to one embodiment. Those of skill in the art will recognize that alternative embodiments of the system may perform the illustrated steps in different orders, perform additional steps, or omit certain steps. In one embodiment, the steps are carried out by the modules and subsystems represented in FIGS. 1, 3, and 5.

In a sample operation of a batch creation and import system, an enterprise 102 receives input documents 110 and a specification 120 from various sources inside or outside of the enterprise 102. The enterprise 102 provides the input documents 110 and specification 120 to a conversion facility 104 by way of a transport interface 160. The conversion facility includes the batch generator 140 shown in FIG. 1. The batch generator 140 of FIG. 1 uses the input documents 110 and specification 120 to create a batch file 150 containing electronic files 152 and descriptions 154 of the electronic files 152. The electronic files 152 and descriptions 154, in the form of the batch 150, are received by the batch module 330. The batch import module 420 of FIG. 5 receives the batch 150 from the batch module 330. It copies the electronic files 152 from the batch 150 and imports them to the data store 130 of FIG. 1. It also indexes the electronic files 152 610 based on information contained in the descriptions 154 to facilitate later access by the user application 410 of FIG. 1.

We claim:

1. A method of integrating a plurality of input documents in a first format into a data store holding documents in a second format, the method comprising:

supplying from an enterprise to a batch generator the plurality of input documents in the first format and a specification comprising instructions for creating a description of the documents and a batch of electronic images of the documents based on attributes of the documents and syntax rules for the description, wherein the attributes include document source information and document content information, and further wherein the specification originates from the enterprise;

receiving the batch in the second format from the batch generator;

receiving in the data store a description of the documents generated responsive to the specification; and importing the batch in the second format into the data store responsive to the description, wherein the data store is located in the enterprise.

2. The method of claim 1 wherein the attributes disclosed in the plurality of input documents include at least one of the creation date of each of the document, the source of each of the document, content contained in each of the document and the location of each of the documents on a storage medium.

3. The method of claim 1 further comprising:

receiving the documents in the second format and the description of the documents as part of a batch file also containing a plurality of other documents in the second format and associated descriptions of the plurality of other documents; wherein the other documents in the second format are configured to be imported into the data store responsive to the associate descriptions of the other documents in the second format.

4. The method of claim 1 further comprising indexing the documents imported into the data store based on indexing data contained in the description.

5. The method of claim 1 wherein the specification comprises an XML Document Type Definition that describes element names and XML syntax rules for creating a description of the documents.

6. The method of claim 1 wherein the description comprises a well-formed XML document file generated responsive to the XML Document Type Definition.

7. The method of claim 1, wherein the documents in the first format comprises a paper document, and the documents in the second format comprises an electronic file.

8. A system for integrating a plurality of documents in a first format into a data store holding documents in a second format, the system comprising:

a data store comprising a repository configured to store a plurality of documents in the first format and a specification comprising instructions for creating descriptions of the plurality of documents based on attributes of the documents and syntax rules, the repository further configured to supply the documents and specification to a conversion facility;

a batch import module adapted to receive from the conversion facility a batch including the plurality of documents in the second format and descriptions of the plurality of documents in the second format generated responsive to the specification, wherein the batch import module is further adapted to import the batch including the plurality of documents in the second format into the data store responsive to the descriptions, and wherein the data store is further configured to provide user access to the plurality of documents in the second format.

9. The system of claim 8 wherein a single batch file contains the plurality of documents in the second format and the descriptions of the plurality of documents in the second format, and the batch import module receives the plurality of documents in the second format and the descriptions of the plurality of documents in the second format in the form of the single batch file.

10. The system of claim 8 wherein the descriptions contain indexing data and the data store is further adapted to store references in an index to the plurality of documents imported into the data store responsive to the indexing data contained in the descriptions.

11. The system of claim 8 wherein the specification comprises an XML Document Type Definition that describes element names and XML syntax rules for creating a description of the document.

12. The system of claim 11 wherein the description comprises a well-formed XML document file generated responsive to the XML Document Type Definition.

13. The system of claim 8, wherein the plurality of documents in the first format comprise paper documents, and the plurality of documents in the second format comprise electronic files.

14. The system of claim 8, wherein the specification further comprises:

instructions for storing documents with shared attributes in a common batch file, creating a batch file default description of the documents with shared attributes responsive to the shared attributes of the documents, and using the batch default description to create descriptions of the documents with shared attributes.

15. A computer-implemented method for integrating electronic files into a data store responsive to descriptions of the files, the method comprising:

receiving from a batch generator the electronic files and the descriptions of the files, the descriptions descriptive of attributes of the electronic files, the electronic files and description generated responsive to a set of. input documents and a specification comprising instructions for describing the files and syntax rules for the descriptions;

locating the electronic files on a storage medium based on location information contained within the descriptions;

copying the electronic files into the data store;

extracting indexing data associated with the electronic files from the descriptions of the electronic files; and indexing the electronic files in the data store responsive to the indexing data extracted from the descriptions of the electronic files.

16. The method of claim 15 further comprising creating references in an index to the electronic files in the data store responsive to the indexing data to enable subsequent access to the files by a user application using the index.

17. The method of claim 15 wherein the electronic files and the descriptions of the files are stored in a single batch and further comprising:

receiving the electronic files and the descriptions of the files in the form of the single batch.

18. The method of claim 15 further comprising indexing the electronic files in the data store responsive to batch-level indexing data extracted from the descriptions of the electronic files.

19. The method of claim 15 wherein the step of extracting indexing data about the electronic files form the descriptions of the electronic files is performed by a parser and further comprising the steps of:

locating valid indexing data about the electronic files contained in the descriptions responsive to the syntax rules in the specification;

extracting valid indexing data from the descriptions; and outputting the valid indexing data to the data store.

20. A computer implemented batch import apparatus for integrating a plurality of electronic files into data store, the apparatus comprising:

a data store comprising a repository configured to receive the electronic files and the descriptions of the files; the electronic files and the description generated responsive to a set of input documents and a specification comprising instructions for describing attributes of the files and syntax rules for the descriptions;

a file import module adapted to locate the electronic files based on location information contained within the descriptions of the files and import the electronic files into the data store; and an indexing module adapted to index the electronic files in the data store responsive to the indexing extracted from the descriptions of the electronic files.

21. The apparatus of claim 20 further comprising a user application module configured to access an electronic file in the data store.

22. The apparatus of claim 20, wherein a single batch file contains the electronic files and the descriptions of the files, and the repository receives the electronic files and the descriptions of the files in the form of the single batch file.

23. The apparatus claim 20 further wherein the indexing module indexes the electronic files in the database store responsive to batch-level indexing data extracted from the descriptions of the electronic files.

24. The apparatus claim 20 further comprising a parser for locating valid indexing data about the electronic files contained in the descriptions responsive to the syntax definitions in the specification, extracting valid indexing data from the descriptions, and outputting the valid indexing data to the indexing module.

25. The apparatus of claim 20, wherein the specification further comprises instructions for storing files with stared attributes in a common batch, creating a batch default description of the files with shared attributes responsive to the shared attributes of the files, and using the batch default description to create descriptions of the file with shared attributes.

26. A computer program product comprising:

a computer readable medium; and computer program instructions, encoded on the medium for controlling a processor to perform the operations of:

receiving a document in a second format converted from a document in a first format;

receiving a well-formed XML source file describing the document generated responsive to an XML Document Type Definition and descriptive of an attribute of the document;

importing the document into a data store responsive to attribute descriptions contained in the XML source file; and accessing the document in the data store.

27. A computer program product comprising:

a computer readable medium; and computer program instructions encoded on the medium, for controlling a processor to perform the operations of:

receiving electronic files and descriptions of the files, the descriptions descriptive of attributes of the electronic files and generated responsive to a specification comprising instructions for describing the files and syntax rules for the descriptions;

locating electronic files on a storage medium based on location information contained within the descriptions;

copying the electronic files into a data store;

extracting indexing data about the electronic files from the descriptions of the electronic files; and indexing the electronic files in the data store responsive to the indexing data extracted from the descriptions of the electronic files.

28. The computer program product of claim 27, further comprising:

computer program instructions, encoded on the medium, for controlling a processor to perform the operation of:

creating references in an index to the electronic files in the data store responsive to the indexing data to enable subsequent access to the files by a user application using the index.

29. The computer program product of claim 27, further comprising:

computer program instructions, encoded on the medium, for controlling a processor to perform the operation of:

indexing the electronic files in the data store responsive to batch-level indexing data extracted from the descriptions of the electronic files.

30. The computer program product of claim 27, further comprising:

computer program instructions, encoded on the medium, for controlling a processor to perform the operations of:

locating valid indexing data about the electronic files contained in the descriptions responsive to the syntax rules in the specification;

extracting valid indexing data from the descriptions; and outputting the valid indexing data to the data store.

* * * * *